Patented June 26, 1951

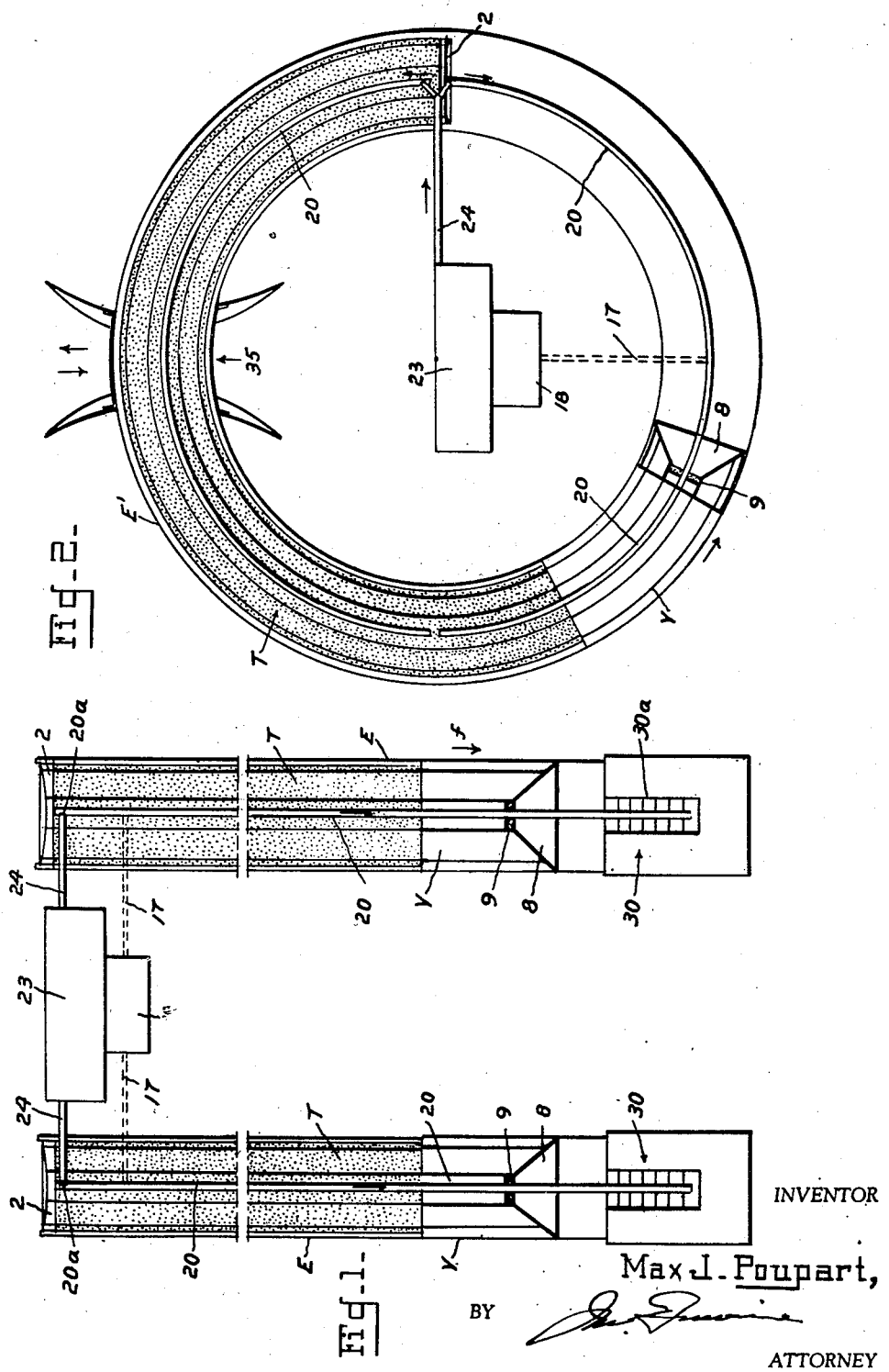

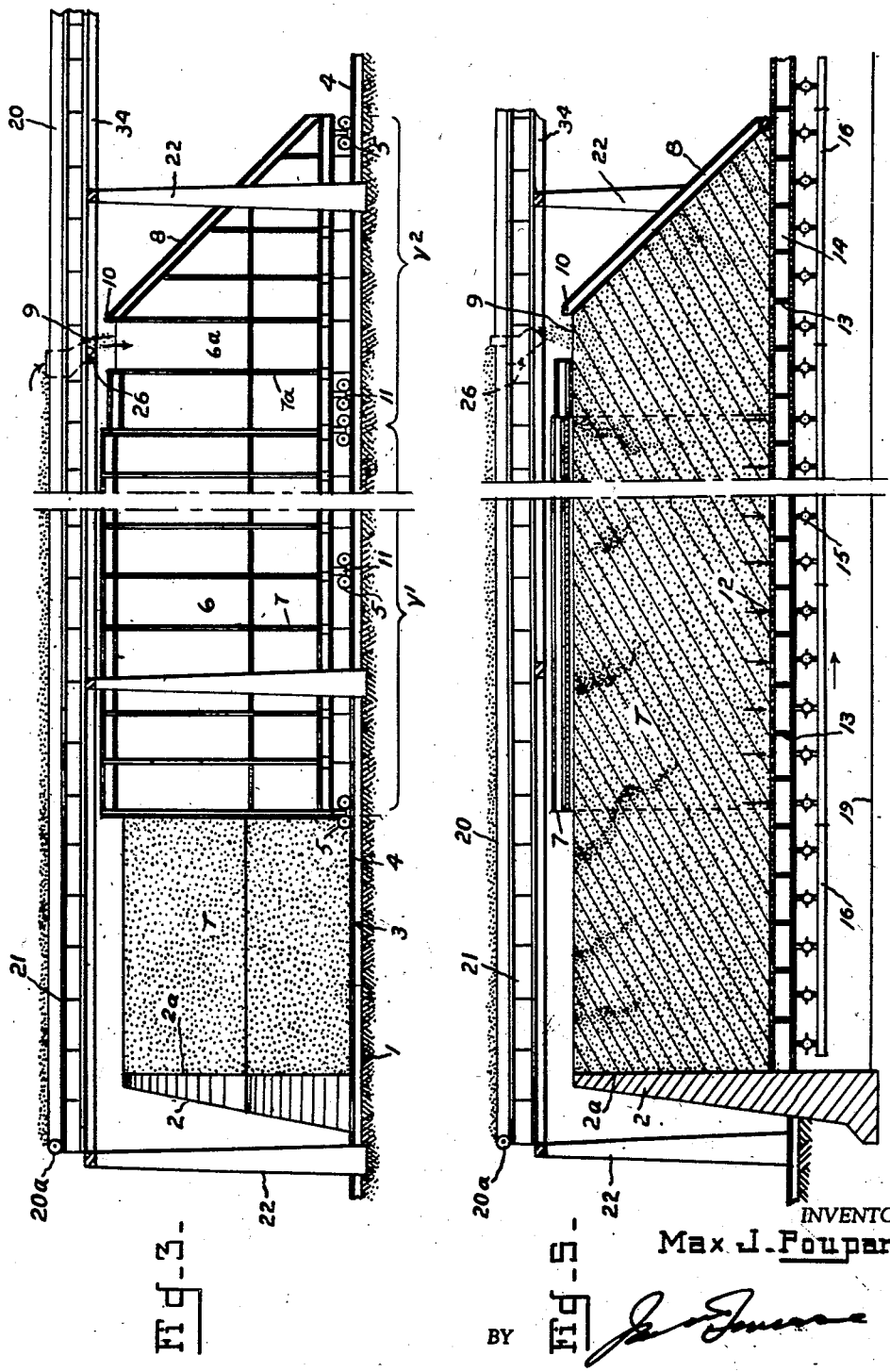

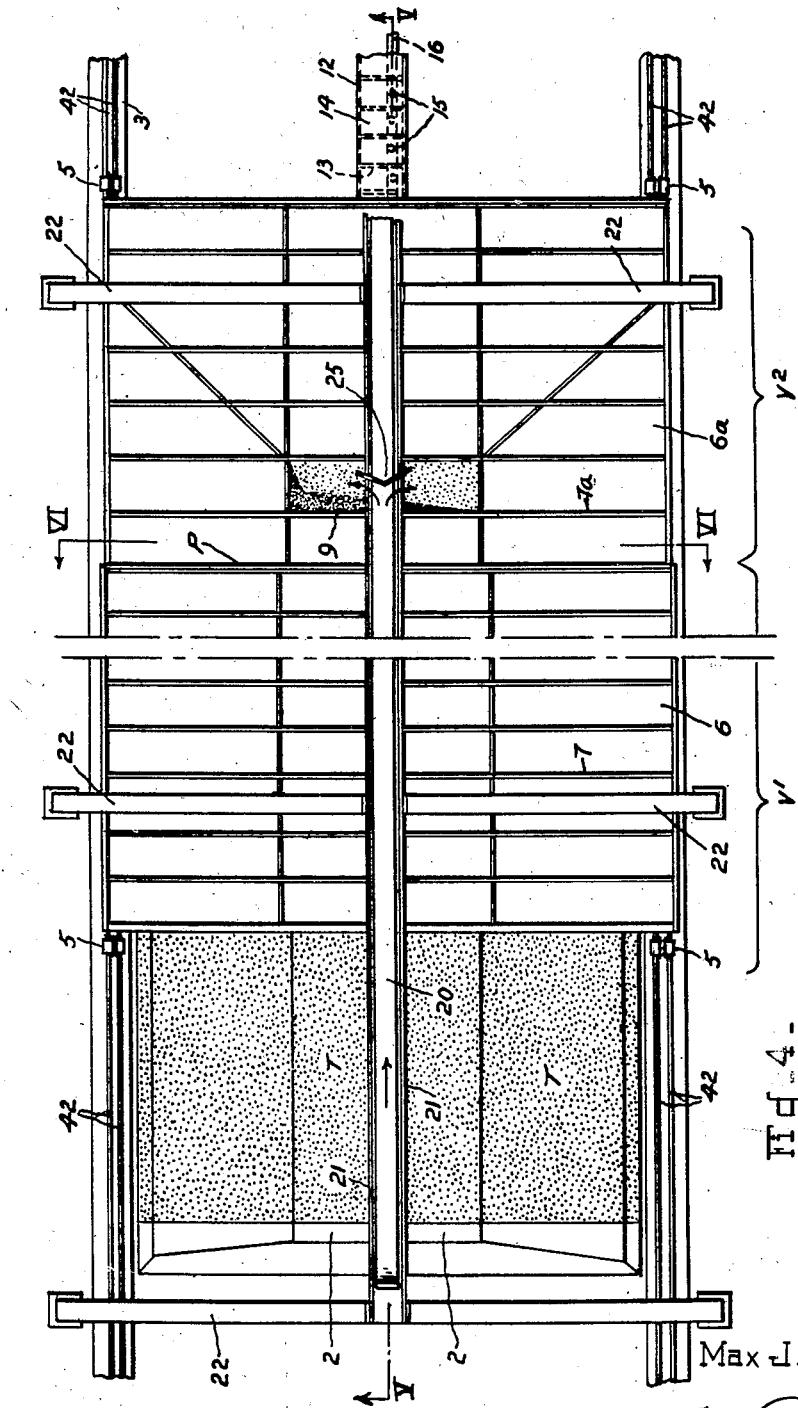

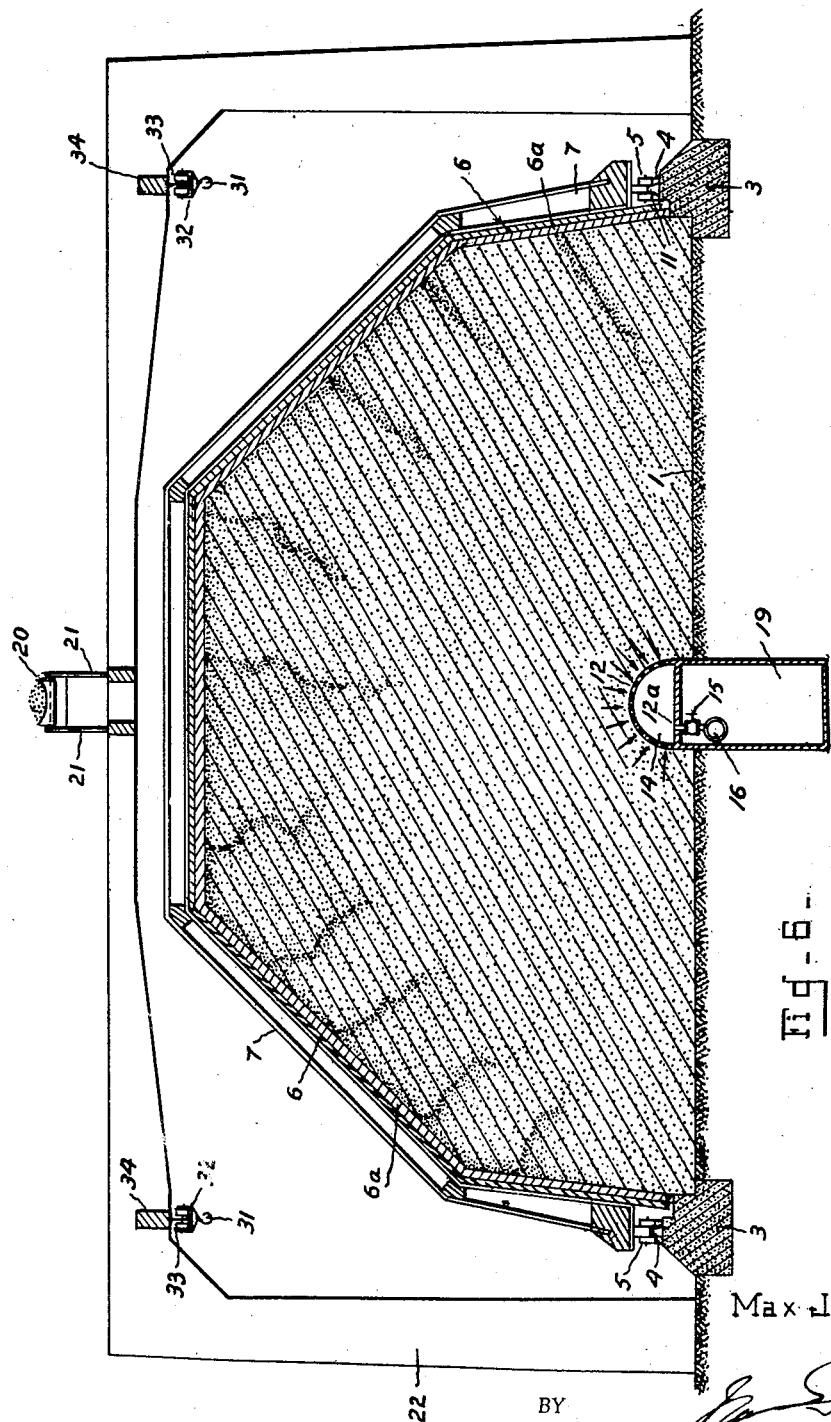

2,558,155

UNITED STATES PATENT OFFICE 2,558,155

PLANT FOR THE CONTINUOUS ZYMO-THERMIC FERMENTATION OF ALL ORGANIC MATTERS

Max Jean Poupart, Versailles, France

Application March 15, 1949, Serial No. 81,532
In France March 31, 1948

7 Claims. (Cl. 195—139)

The means heretofore employed for carrying out the zymothermic fermentation of organic matters, particularly of household refuse, in view of the manufacture of manure, comprise continuously or intermittently working cells which necessitate complicated and expensive handlings, since it is necessary first to fill the cells, then to empty them after fermentation of the matters, and finally to transport the products to a stocking area and to heap them up there.

This invention relates to a novel plant for carrying out the accelerated aerobic fermentation of all fermentable matters which makes it possible to do away with the operations consisting in emptying the cells, transporting the products to a stocking area and heaping them up.

With this object in view, the plant according to this invention comprises essentially a rectilinear or circular floor adapted to serve as a supporting base for the matters to be treated; a stationary front wall transversal to said floor; a mobile vault open at its front end, adapted to be engaged over said front wall and terminated at its rear end by an inclined rear wall sloping in accordance with the natural angle of embankment of the matters to be treated, said vault being adapted to cover a part of the length of said floor and to be moved along said floor, starting from an initial position in which said vault is engaged by its open end over said front wall as far as the vicinity of said inclined rear wall, said vault being formed with a filling opening adjacent to the upper end of said inclined rear wall and having such a length that the total volume of the matters covered by said vault is substantially equal to the volume of matters to be filled into said vault every day, multiplied by the number of days necessary for the fermentation of said matter; and means for passing a continuous current of air through the matters covered by said mobile vault, in each of its positions.

It results from this general arrangement that, when said vault is moved back every day a length equal to the horizontally measured thickness of a batch of matters which is poured daily into said vault through said filling opening and takes the shape of a natural heap limited by the inclined rear wall of the vault, the fermentation of every batch will be completed between the day of its introduction into said vault and the day when it will be uncovered by the open end of the vault, whereafter the matters can remain heaped up on the spot, on said floor, for a time which can be equal to the duration of fermentation multiplied by the ratio between the length of the floor and the length of the mobile vault.

Advantageously, in order to avoid that after the introduction of the first batch of matters the mobile vault rubs against the top of the matters, as well as in order to facilitate the entry of air, said vault comprises a first portion adjacent to its inclined rear wall and having a cross section corresponding substantially to the outline of said stationary front wall, and a second portion adjacent to the open end of said vault and having a slightly larger cross section than said first portion.

The inclined rear wall is advantageously hinged to the vault, so that said inclined rear wall can be lifted, thus permitting the vault to be returned to its initial position by passing it over the heap of matters, in the case of a rectilinear floor, or by passing it over the stationary front wall, in the case of a circular floor.

In the case of a rectilinear floor, a fixed shed is advantageously provided at the end of said floor, so that the rear portion of the mobile vault can be engaged under said shed. Due to this arrangement, after the last batch of matters has been poured into the mobile vault, the latter can be returned immediately to its initial position, the fermentation of said last batch taking place under the protection of said fixed shed.

Other features of the invention will appear in the following specification and in the accompanying drawings which show, by way of example, two embodiments of the invention.

Fig. 1 is a general plan view of the first embodiment.

Fig. 2 is a general plan view of the second embodiment.

Fig. 3 is a partial side view in elevation, at a larger scale, corresponding to either of said embodiments.

Fig. 4 is a plan view corresponding to Fig. 3.

Fig. 5 is a cross-sectional view taken on line V—V of Fig. 4.

Fig. 6 is a cross sectional view taken on line VI—VI of Fig. 4.

In the embodiment shown in Fig. 1, the plant comprises two rectilinear elements E, while in the embodiment shown in Fig. 2 it comprises a single element $E^1$ in the shape of a closed circle.

In any case, each element comprises, as shown in Figs. 3 to 6, a floor 1 which is constituted by a road-like bed having a length and a width which are appropriate for the volume of matters to be treated daily and for the dimensions of the available area. Across said floor extends a stationary end wall 2 the outline of which has a shape approaching that of a semi-circle, for example a polygonal shape.

Along each longitudinal edge of said floor 1 extends a low wall 3 (Figs. 3 and 6) supporting two rails 4 on which rest wheeled carriages 5 provided on each longitudinal lower edge of the mobile vault V (Figs. 1 and 2).

This mobile vault V comprises two portions placed one behind the other. The first or front portion $V^1$ of the vault comprises a heat-insulated wall 6 (Fig. 6) having a cross section similar to the outline of the front wall 2, but slightly larger than the latter, the wall 6 being reinforced externally by a metallic framework 7.

The second or rear portion $V^2$ of the vault comprises a wall 6a the shape of which is similar to that of the wall 6, but having inner dimensions substantially identical with the outer dimensions of the front wall 2. The wall 6a is also reinforced by a metallic framework 7a. The portion $V^2$ of the vault is terminated by an inclined rear wall 8 (Fig. 3) the inclination of which is equal to the natural angle of embankment of the matters to be treated. Near the top of the inclined rear wall 8, the vault portion $V^2$ is formed at its upper part with a filling opening 9. The inclined rear wall 8 is hingedly connected by its upper end to the vault portion $V^2$, along a horizontal axis 10, so that said inclined rear wall 8 can be lifted, for a purpose to be explained later.

Advantageously, as represented, the vault rests upon the carriages 5 by means of jacks 11 which make it possible to lift the whole vault, as it will be explained later.

At the start, the vault is engaged over the front wall 2 substantially as far as the plane P of the junction between the walls 6 and 6a. The capacity of the rear portion $V^2$ between the plane P and the inclined rear wall 8 is equal to the volume of the matters poured into the vault every day, through the filling opening 9, while the length of the front portion $V^1$ of the vault is such that the volume which can be covered by this portion is substantially equal to the volume of matters to be filled into the vault every day, multiplied by the number of days necessary for their fermentation.

The means for causing a continuous circulation of air through the matters resting on the floor 1 will now be described.

In the shown enbodiment (Figs. 5 and 6), these means comprise a conduit 12 of semi-circular section the curved wall of which is porous or perforated and which extends over the whole length of the floor 1, in the middle thereof. This conduit 12 is divided by partition walls 13 into a succession of compartments 14.

Each compartment 14 is connected, by a tube in which a valve 15 is mounted, to an air main 16 which is in turn connected by a pipe 17 (Figs. 1 and 2) to an aspirating pump placed in a building 18.

Under the bottom 12a of the conduit 12 is provided a corridor 19 containing the main 16 and giving access to the different valves 15.

Any convenient means may of course be provided for pouring the matters to be treated into the filling opening 9.

Thus, for example, an endless belt conveyor 20 may be mounted above the longitudinal axis of the plant, on two longitudinal metallic girders 21 which are themselves supported by portals 22.

The matters to be treated are received in a building 23 from where they are fed by a conveyor 24 to the charging point 20a of each of the conveyors 20. The matters traveling on these conveyors 20 are arrested by a scraper 25 (Fig. 4) which is longitudinally displaceable on the girders 21 and causes the matters to fall laterally into hoppers 26 (Figs. 3 and 5) which are also longitudinally displaceable on the said girders and are brought every day to the position corresponding to that of the filling opening 9 of the movable vault, so that the matters are poured through this opening, onto the floor 1.

The above described plant operates as follows:

The first day, as already mentioned, the movable vault is placed in its initial position, which is such that the plane P coincides substantially with the inner surface 2a of the wall 2. The matters poured in through the opening 9 and falling on the floor 1 form a natural heap which is limited on the one hand by the said inner surface 2a of the wall 2, and on the other hand by the inclined rear wall 8. The following day, before beginning the next charging operation, the vault is moved back a length corresponding to the horizontally measured thickness of the batch of matters to be poured in during this second day. At the same time, the valves 15 of the compartments 14 corresponding to the space left free by the displacement of the vault are opened, which space is filled with matters during this second day, so that the air entering at the upper part into the interval between the wall 6 and the top surface of the heap, will be aspirated through the matters resting on the floor 1, into the main 16. It will be noted that, the cross section of the vault portion $V^1$ being larger than that of the heap of matters T, the displacements of the vault are carried out without difficulty.

Assuming that the length of the mobile vault has been determined in view of an operation extending over twenty days, each batch of matters will remain covered by the vault during twenty days and will consequently ferment for this period of time, whereafter the fermented products can be left on the spot, on the floor 1, which serves thus as a stocking area, until the products are removed in order to be sent to the places of utilisation.

In the case represented on Fig. 1, when the mobile vault of each element E, in its displacements in the direction of the arrow f, has reached the end of the floor 1, it would be necessary, in the absence of some other arrangement, to leave the vault in its place for a time sufficient for the fermentation of the last batch of matters, that is to say for twenty days, in the case of the example given above. In order to remove this drawback, there is provided, above the said end of the floor 1, a fixed shed 30 which is open at its top, at 30a, and has an inclined and hingedly mounted rear wall, similar to that of the vault. As this fixed shed is adapted to protect the last batch of matters during its fermentation, the vault can be returned immediately towards the front wall 2, in front of which the floor has been emptied in the meantime, so that a new cycle of operations can be started at once. For the return movement of the vault towards the wall 2, the inclined rear wall 8 of the vault is lifted, by tilting it about the hinge 10, and is maintained in its raised position, by any appropriate means, so that it can pass over the heap of matters still present on the floor 1. Thus, for example, the hingedly mounted rear wall 8 can be attached to two hooks 31 (Fig. 6) suspended each on a crab 32 rolling on a rail 33 mounted under a longitudinal girder 34. Furthermore, the whole vault, or only its rear portion V², can be lifted by means of the jacks 11, so as to avoid friction between said portion V² and the heap of matters on the floor 1.

It may thus be seen that with the arrangement described and shown, and in the case chosen as an example, every batch of matters will ferment during twenty days, and may then be left on the floor 1 serving as a stocking area, for a great number of days, which is substantially equal to twenty times the ratio between the length of the floor 1 of each element E and the length of the mobile vault.

In the case represented on Fig. 2, where the floor 1 is circular and the vault has in plan a corresponding shape, the operation of the plant can be completely continuous, that is to say, it is unnecessary to provide means such as the shed 30 of Fig. 1. In the arrangement of Fig. 2, when the mobile vault has finished a turn and is arrested by the wall 2, it will be sufficient to lift the inclined wall 8, in the manner indicated above, to enable the vault to pass to the other side of said wall 2 and to begin a new cycle of operations, the matters involved in the beginning of the preceding cycle having meanwhile been removed, in order to be sent away to the places of utilisation.

In the embodiment of Fig. 2, a passage such as shown at 35 must of course be provided under the floor 1, in order to give access to the buildings 17 and 18.

It will be understood that the invention is not limited to the embodiments which have been described and shown by way of example, and that other embodiments are possible without departing from the scope of the invention as defined in the appended claims.

I claim:

1. A plant for the continuous zymothermic fermentation of all organic matters, comprising an elongated floor adapted to serve as a supporting base for the matters to be treated, a stationary front wall transversal to said floor, a mobile vault open at its front end and of a transverse cross-section corresponding to and for fitting over said front wall and terminated at its rear end by an inclined rear wall sloping in accordance with the natural angle of embankment of the matters to be treated, said vault being of a length to cover a part of the length of said floor, means supporting said vault for movement along said floor, starting from an initial position in which said vault is engaged by its open end over said front wall as far as the vicinity of said inclined rear wall, a filling opening in the top of said vault adjacent the upper end of said inclined rear wall, said vault having such a length that the total volume of the matters covered by said vault is equal to the volume of matters to be filled into said vault every day, multiplied by the number of days necessary for the fermentation of said matters, and means for passing a continuous current of air through the matters covered by said mobile vault, in each of its positions.

2. A plant as claimed in claim 1, wherein said mobile vault comprises a first portion adjacent to said inclined rear wall and having a cross section corresponding to the outline of said stationary front wall, and a second portion adjacent to the open end of said vault and having a larger cross section than said first portion.

3. A plant as claimed in claim 1, wherein said inclined rear wall is mounted so as to be able to be lifted, by means of a hinge with horizontal axis connecting the upper end of said inclined rear wall to said vault.

4. A plant for the continuous zymothermic fermentation of all organic matters, comprising a circular ring-like floor adapted to serve as a supporting base for the matters to be treated, a stationary front wall transversal to said floor, a mobile vault open at its front end and of a transverse cross-section corresponding to and for fitting over said front wall and terminated at its rear end by an inclined rear wall sloping in accordance with the natural angle of embankment of the matters to be treated, said vault being of a length to cover a part of the length of said floor, means supporting said vault for movement along said floor, starting from an initial position in which said vault is engaged by its open end over said front wall as far as the vicinity of said inclined rear wall, a filling opening in the top of said vault adjacent the upper end of said inclined rear wall, said vault having such a length that the total volume of the matters covered by said vault is equal to the volume of matters to be filled into said vault every day, multiplied by the number of days necessary for the fermentation of said matters, and means for passing a continuous current of air through the matters covered by said mobile vault, in each of its positions.

5. A plant for the continuous zymothermic fermentation of all organic matters, comprising an elongated rectilinear floor adapted to serve as a supporting base for the matters to be treated, a stationary front wall transversal to said floor, a mobile vault open at its front end and of a transverse cross-section corresponding to and for fitting over said front wall and terminated at its rear end by an inclined rear wall sloping in accordance with the natural angle of embankment of the matters to be treated, said vault being of a length to cover a part of the length of said floor, means supporting said vault for movement along said floor, starting from an initial position in which said vault is engaged by its open end over said front wall as far as the vicinity of said inclined rear wall, a filling opening in the top of said vault adjacent the upper end of said inclined rear wall, said vault having such a length that the total volume of the matters covered by said vault is equal to the volume of matters to be filled into said vault every day, multiplied by the number of days necessary for the fermentation of said matters, means for passing a continuous current of air through the matters covered by said mobile vault, in each of its positions, and a fixed shed mounted at the rear end of said floor and adapted to receive the rear portion of said mobile vault.

6. Apparatus for the continuous zymothermic fermentation of organic matter, comprising an elongated floor for supporting the matter to be treated, an upright wall fixed transversely on said floor, a vault spanning said floor and having a transverse cross-section corresponding to and for fitting over said wall, means supporting said vault for movement along said floor relative to said wall, one end of said vault being open to receive said wall and initially cooperate therewith in forming a fermentation chamber, a filling opening in the top of said vault adjacent the other end thereof, said other vault end being closed by an end closure for confining matter discharged into said filling opening, means removably supporting said end closure to permit opening of the end of the vault for passage over obstacles, and air supply means longitudinally beneath said vault.

7. Apparatus for the continuous zymothermic fermentation of organic matter, comprising an elongated floor for supporting the matter to be treated, an upright wall fixed transversely on said floor, a vault spanning said floor and having a transverse cross-section corresponding to and for closely fitting over said wall, means supporting said vault for movement longitudinally along said floor relative to said wall, one end of said vault being open to receive said wall and initially co-operate therewith in forming a fermentation chamber, a filling opening in the top of said vault adjacent the other end thereof, said other vault end being closed by an end closure for confining matter discharged into said filling opening, said end being inclined to coincide with the natural slope of embankment of the matter discharged into said filling opening, means removably supporting said end closure to permit opening of the end of the vault for passage over obstacles on said floor, air supply means longitudinally of said floor, and control means for said air supply means and selectively operative to supply air through a selected longitudinal portion of said air supply means.

MAX JEAN POUPART.

REFERENCES CITED

The following references are of record in the file of this patent:

UNITED STATES PATENTS

| Number | Name | Date |
|---|---|---|
| Re. 12,728 | Rice | Dec. 3, 1907 |
| 270,619 | Weschler | Jan. 16, 1883 |
| 529,842 | Schultz | Nov. 27, 1894 |
| 1,448,391 | Cromer | Mar. 13, 1923 |

FOREIGN PATENTS

| Number | Country | Date |
|---|---|---|
| 22,528 | Austria | of 1905 |
| 589,142 | Germany | of 1932 |